(12) United States Patent
Du et al.

(10) Patent No.: US 11,094,103 B2
(45) Date of Patent: Aug. 17, 2021

(54) GENERAL PURPOSE REGISTER AND WAVE SLOT ALLOCATION IN GRAPHICS PROCESSING

(71) Applicant: QUALCOMM Incorporated, San Diego, CA (US)

(72) Inventors: Yun Du, San Diego, CA (US); Andrew Evan Gruber, Arlington, MA (US); Chun Yu, Rancho Santa Fe, CA (US); Chihong Zhang, San Diego, CA (US); Hongjiang Shang, San Diego, CA (US); Zilin Ying, San Diego, CA (US); Fei Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/364,829

(22) Filed: Mar. 26, 2019

(65) Prior Publication Data
US 2020/0312006 A1    Oct. 1, 2020

(51) Int. Cl.
*G06T 15/04* (2011.01)
*G06F 9/54* (2006.01)
*G06F 9/38* (2018.01)

(52) U.S. Cl.
CPC .......... *G06T 15/04* (2013.01); *G06F 9/3877* (2013.01); *G06F 9/544* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0296729 | A1* | 12/2007 | Du | G06F 9/30138 345/559 |
| 2010/0100712 | A1* | 4/2010 | Mejdrich | G06F 9/3009 712/214 |
| 2015/0084975 | A1* | 3/2015 | Heinrich | G06T 15/04 345/552 |
| 2015/0286011 | A1* | 10/2015 | Nhep | G02B 6/38 385/60 |

(Continued)

OTHER PUBLICATIONS

Aaltonen S., "Optimizing GPU Occupancy and Resource Usage with Large Thread Groups—GPU Open," May 24, 2017 (May 24, 2017), XP055697479, Retrieved from the Internet: URL: https://gpuopen.com/learn/optimizing-gpu-occupancy-resource-usage-large-thread-groups/ [retrieved on May 20, 2020], section: AMD GCN compute unit (CU).

(Continued)

*Primary Examiner* — Wesner Sajous
(74) *Attorney, Agent, or Firm* — Qualcomm Incorporated

(57) ABSTRACT

Example techniques are described for generating graphics content by obtaining texture operation instructions corresponding to a texture operation, in response to determining at least one of insufficient general purpose register space is available for the texture operation or insufficient wave slots are available for the texture operation, generating an indication that the texture operation corresponds to a deferred wave, executing the texture operation, sending, to a texture processor, initial texture sample instructions corresponding to the texture operation that was executed, and receiving texture mapped data corresponding to the initial texture sample instructions.

18 Claims, 6 Drawing Sheets

(56) References Cited

U.S. PATENT DOCUMENTS

| | | | |
|---|---|---|---|
| 2016/0098276 A1* | 4/2016 | Du | G06F 9/3012 |
| | | | 712/217 |
| 2016/0321773 A1* | 11/2016 | Bolz | G06T 15/005 |
| 2018/0293097 A1* | 10/2018 | Rhee | G06F 9/4881 |
| 2018/0300944 A1* | 10/2018 | Surti | G06T 15/503 |
| 2019/0205737 A1* | 7/2019 | Bleiweiss | G06N 20/00 |
| 2020/0250877 A1* | 8/2020 | Kazakov | G06T 15/04 |

OTHER PUBLICATIONS

International Search Report and Written Opinion—PCT/US2020/024458—ISA/EPO—dated Jun. 26, 2020.
Jablin J.A., et al., "Warp-aware Trace Scheduling for GPUs," Proceedings of the 23rd International Conference on Parallel Architectures and Compilation Techniques; Aug. 24-27, 2014; Edmonton, AB, Canada, ACM, 2 PennPlaza, Suite 701 New York NY 10121-0701, USA, Aug. 24, 2014 (Aug. 24, 2014), pp. 163-174, XP058054102, DOI: 10.1145/2628071.2628101, ISBN: 978-1-4503-2809-8, abstract.
Rogers T G., et al., "Cache-Conscious Wavefront Scheduling," 2014, 47th Annual IEEE/ACM International Symposium on Microarchitecture, [Proceedings of the Annual ACM/IEEE International Symposium On Microarchitecture], IEEE Computer Society, 1730 Massachusetts Ave., NW Washington, DC 20036-1992 USA, Dec. 1, 2012 (Dec. 1, 2012), pp. 72-83, XP058014414, ISSN: 1072-4451, DOI: 10.1109/MICR0.2012.16, ISBN: 978-0-7695-3047-5, Abstract.

\* cited by examiner

GENERAL PURPOSE REGISTER AND WAVE SLOT ALLOCATION IN GRAPHICS PROCESSING

BACKGROUND

Graphics Processing Units (GPUs) are increasingly being utilized in different types of devices, including mobile devices, such as smartphones, virtual reality (VR) devices, augmented reality (AR) devices, tablet computers, smartwatches, and the like. Many GPUs utilize streaming processors (SPs), which can be built into the GPU. The streaming processor in a GPU can handle most of the traditional graphics rendering tasks, and/or can be programmed for more general-purpose number processing. Streaming processors are well suited for traditional GPU-focused tasks such as graphics, image, video and signal processing, and work well for ray tracing, computational fluid dynamics, weather modelling, etc.

As part of generating graphics content, the GPU and/or a streaming processor can perform texture mapping, which can be a process for defining high frequency detail, surface texture, or color information on a graphic or three-dimensional (3D) model rendered in a scene. In particular, the streaming processor may be well suited for texture mapping tasks. However, a constraint associated with the streaming processor, as well as many other hardware components, is the total amount of memory, registers, wave slots of an execution unit and the like, that are available for use.

SUMMARY

The systems, methods, and devices described herein each have several aspects, no single one of which is solely responsible for its desirable attributes. Without limiting the scope of this disclosure, several non-limiting features will now be described briefly.

Methods, devices, apparatus, and computer-readable media for generating graphics content are described herein. A method can include obtaining texture operation instructions corresponding to a texture operation, in response to determining at least one of insufficient general purpose register space is available for the texture operation or insufficient wave slots are available for the texture operation, generating an indication that the texture operation corresponds to a deferred wave, executing the texture operation, sending, to a texture processor, initial texture sample instructions corresponding to the texture operation that was executed, and receiving texture mapped data corresponding to the initial texture sample instructions.

In some embodiments, the method can further include generating a virtual wave slot corresponding to the texture operation.

In additional embodiments, the method can further include, subsequent to the determining at least one of insufficient general purpose register space is available for the texture operation or insufficient wave slots are available for the texture operation, determining sufficient general purpose register space is available for the texture operation and sufficient wave slots are available for the texture operation, converting the virtual wave slot to a wave slot, and storing texture attributes corresponding to the texture operation in the general purpose register In further embodiments, the method can include, subsequent to the converting the virtual wave slot and the storing the texture attributes, performing post-processing on the texture mapped data using the wave slot and the texture attributes.

In some embodiments, the method can include executing the texture operation using a pixel interpolation unit.

In additional embodiments, the method can include sending data corresponding to the texture mapped data to downstream components of a processor, where the data further corresponds to a frame of content that is output to a display.

In further embodiments, the method can include repeatedly determining whether sufficient general purpose register space and wave slots are available for the texture operation, and upon determining that sufficient general purpose register space is available and sufficient wave slots are available for the texture operation: converting the virtual wave slot to a wave slot, and storing texture attributes corresponding to the texture operation in the general purpose register.

In some embodiments, the method can include obtaining second texture operation instructions corresponding to a second texture operation, determining at least one of insufficient general purpose register space is available for the second texture operation or insufficient wave slots are available for the second texture operation, determining buffer storage space and a wave slot are needed for the second texture operation, storing a virtual wave slot corresponding to the second texture operation in a texture buffer, and storing texture attributes corresponding to the second texture operation in the texture buffer.

A device can include a memory and a processor coupled to the memory configured to cause the device to perform a method that includes obtaining texture operation instructions corresponding to a texture operation, in response to determining at least one of insufficient general purpose register space is available for the texture operation or insufficient wave slots are available for the texture operation, generating an indication that the texture operation corresponds to a deferred wave, executing the texture operation, sending, to a texture processor, initial texture sample instructions corresponding to the texture operation that was executed, and receiving texture mapped data corresponding to the initial texture sample instructions.

In some embodiments, the device can include a display and/or the memory can include a texture buffer.

In additional embodiments, the device can be a wireless communication device.

A computer-readable medium can be a non-transitory computer-readable medium that stores a program containing instructions that, when executed by a processor of a device, cause the device to perform a method that includes obtaining texture operation instructions corresponding to a texture operation, in response to determining at least one of insufficient general purpose register space is available for the texture operation or insufficient wave slots are available for the texture operation, generating an indication that the texture operation corresponds to a deferred wave, executing the texture operation, sending, to a texture processor, initial texture sample instructions corresponding to the texture operation that was executed, and receiving texture mapped data corresponding to the initial texture sample instructions.

An apparatus can include means for obtaining texture operation instructions corresponding to a texture operation, means for, in response to determining at least one of insufficient general purpose register space is available for the texture operation or insufficient wave slots are available for the texture operation, generating an indication that the texture operation corresponds to a deferred wave, means for executing the texture operation, means for sending, to a texture processor, initial texture sample instructions corresponding to the texture operation that was executed, and means for receiving texture mapped data corresponding to the initial texture sample instructions

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
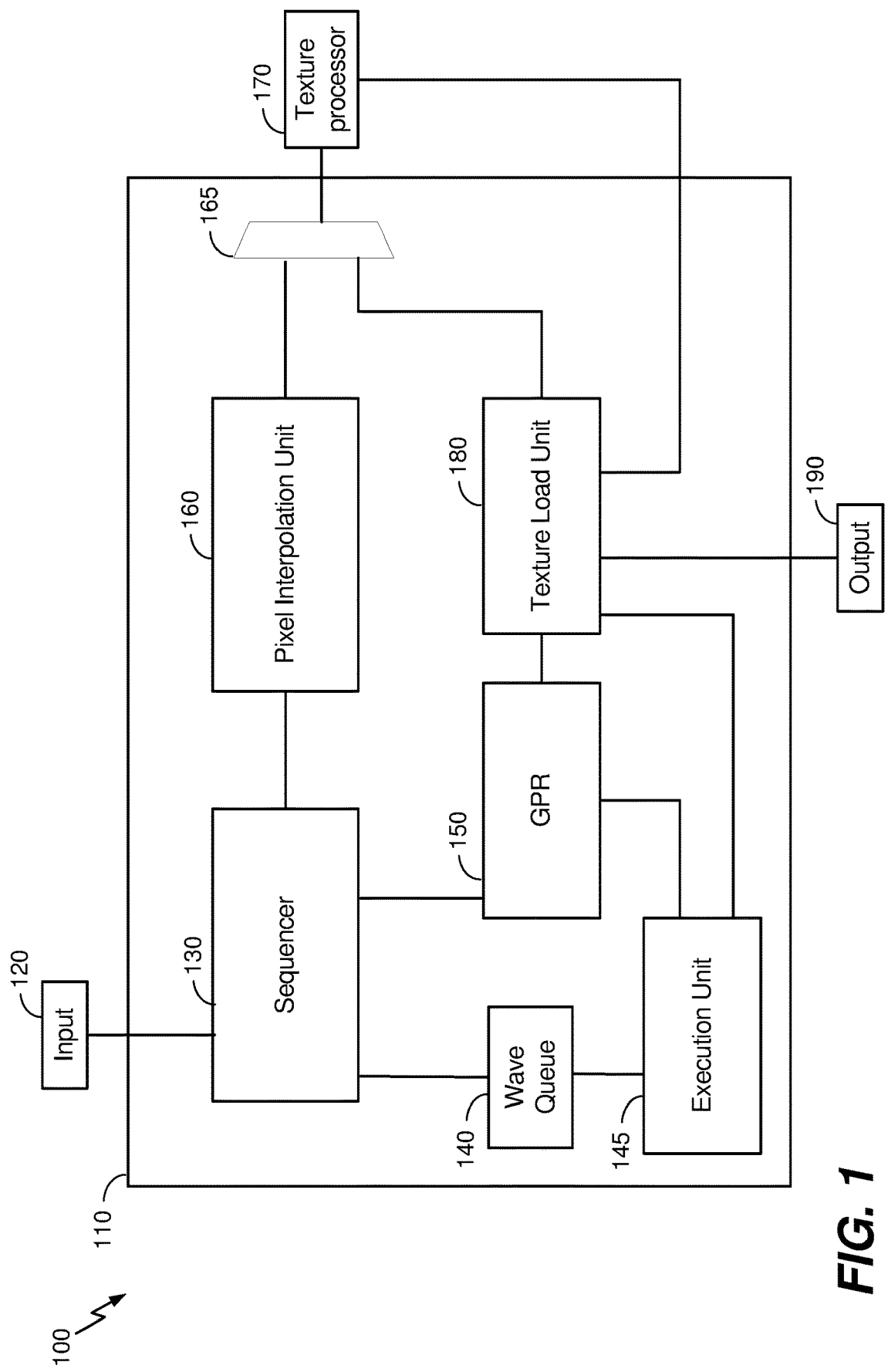
FIG. 1 illustrates an example device that includes a streaming processor and a texture processor, consistent with disclosed embodiments.

Although particular embodiments are described herein, other embodiments, including embodiments that do not provide all of the benefits and features set forth herein, will be apparent to those of ordinary skill in the art.

This specification describes multi-threaded streaming processors (e.g., also referred to as streaming processors), which can be graphics processors, or can be included in graphics processors (e.g., GPUs). This specification further describes efficient allocation of general purpose registers (a group of general purpose registers, hereinafter referred to as a GPR) and physical wave slots of an execution unit to threads being executed by a streaming processor. In this specification, a streaming processor can be configured to obtain and schedule execution of instructions associated with threads, and can include, or have access to, a group of registers (e.g., GPRs). The GPRs can include one or more registers (e.g., a block of general purpose registers, a general purpose register space, a general purpose register footprint, etc.) that can store (e.g., temporarily) data associated with execution of the instructions, and can be volatile or non-volatile memory. Additionally, the streaming processor can include one or more execution units (e.g., arithmetic logic units (ALUs)) to perform computations, one or more units associated with memory operations, etc.

A streaming processor can execute multitudes of threads. Such threads can, in some instances, be grouped together according to particular code (e.g., instructions) and the grouped threads can be executed in parallel. For instance, a group of threads (e.g., a warp, a wavefront, a wave, etc., hereinafter referred to as a wave) can include a particular number of threads, with each thread repeatedly executing a same portion of code, such as a shader (e.g., instructions associated with rendering an image in specific, unique ways) or a kernel (e.g., a compute kernel). The streaming processor can execute, in parallel, (1) a multitude of threads and/or (2) a multitude of groups of threads, and the techniques described herein can be applied in any case. As an example, the streaming processor can execute multitudes of groups of threads, with each group of threads corresponding to execution of a respective portion of code. For instance, the streaming processor can interleave between the groups of threads, such that each group can be executed. As another example, the streaming processor can execute multitudes of threads, with each thread corresponding to execution of a respective portion of code. For convenience, the specification refers to a thread as being a particular thread or a group of threads, both associated with execution of a particular portion of code.

In a streaming processor, texture operations can have a relatively long latency. Latency can be a significant aspect of the performance of the graphics processor. Such latency can be mitigated by having more threads executing on the GPU, so that some threads can be executing ALU operations while others are waiting for the texture operation to complete. This can be referred to as 'latency hiding.' To increase latency hiding, for example, more memory can be included on the graphics processor. However, including additional memory (e.g., increasing a size of the memory) typically increases cost. For example, a GPR can store data for different threads executing in parallel. The GPR size can be increased to improve the latency hiding capability of executing the threads. However, the GPR can be multi-port random access memory (RAM), which is more expensive and uses more physical space than single-port RAM (e.g., three to four times the bit area of single-port RAM). Thus, the GPR size can be expensive to increase.

Additionally, wave slots can be physical storage used by a streaming processor to schedule work for an execution unit (e.g., an ALU). A "wave" can represent the smallest unit of scheduled work for the execution unit and can include multiple threads (e.g., 64 threads). Similar to the GPR size, the number of physical wave slots can be increased to improve latency hiding when executing the threads. However, increasing the number of physical wave slots is similarly expensive. Accordingly, GPU technology can be improved by more efficiently utilizing the available physical wave slots and the GPR.

Aspects of this disclosure relate to efficient allocation of GPR space and physical wave slots.

In general, a streaming processor processes a texture operation by: allocating a physical wave slot(s) for execution, by an execution unit, of a wave corresponding to the texture operation; and allocating GPR space to store texture attributes. The execution unit can process the physical wave slots in a sequential order and/or suspend waves while waiting for memory operations to complete. When scheduled, the execution unit can access the stored texture attributes to process the texture operation wave(s), the execution unit can determine texture coordinates, which can then be stored in the GPR, and the execution unit can determine a texture request, which can be sent to a texture load unit. Based on the texture request, the texture load unit can retrieve the texture coordinates from the GPR and send texture sample instructions to a texture processor. Based on the texture sample instructions, the texture processor can perform, for example, texture mapping and texture filtering, and output texture mapped data to the texture load unit. The texture load unit can then write the texture mapped data to the GPR, which may be subsequently used for post-processing.

As described above, the streaming processor allocates a physical wave slot(s) and GPR space prior to sending texture sample instructions to the texture processor. However, for some texture operations, the streaming processor may be able to operate without using the execution unit prior to sending texture sample instructions to the texture processor. For example, for some texture operations, the streaming processor (and/or a pixel interpolation unit (PI)) can generate and send an initial texture sample instruction to the texture processor, without using an execution unit. Because the execution unit is not used at this stage, the streaming processor can perform the texture operation without initially allocating a physical wave slot(s) and/or GPR space. At a subsequent time (e.g., after the filtered and texture mapped data is received from the texture processor), the streaming processor can allocate the physical wave slot(s) and GPR space for storing the return data (e.g., for post-processing operations). Thus, by not initially allocating a physical wave slot(s) and GPR space for such texture operations, more physical wave slots and GPR space can be available for other operations and the streaming processor may not have to wait until space is available to perform the texture operation. Thus, throughput of the streaming processor can be increased.

In another embodiment, a texture buffer can be used to increase the amount of texture processing latency hiding even with a more complex texture operation. The texture buffer can be a type of memory (e.g., single-port RAM) that is less costly to add to a streaming processor than additional physical wave slots and/or GPR space. For instance, in more complex texture operations, when the physical wave slots and/or GPR space are full, the streaming processor can use a virtual wave slot(s), stored in the texture buffer, instead of a physical wave slot(s), and further use the texture buffer to store texture attributes until a physical wave slot(s) and GPR space becomes available. By storing the virtual wave slot(s) and texture attributes in the texture buffer, the streaming processor can continue to issue initial texture sample instructions (e.g., for simple operations that do not use the execution unit), instead of waiting for a physical wave slot(s) and GPR space for more complex texture operations.

It is understood that, in some instances, a texture operation can correspond to more than one wave and, accordingly, be associated with more than one physical or virtual wave slots. However, for the sake of conciseness, the following description may refer to a physical or virtual wave slot (i.e., in the singular), but the same or similar processes can be applied to more than one physical or virtual wave slots, where appropriate, consistent with disclosed embodiments. Thus, reference to a single physical or virtual wave slot is not intended to be limiting.

Embodiments described herein are described with regard to texture operations, however, in other embodiments, the techniques described herein can be used for other operations, such as retrieving color information or performing general purpose computing tasks. Accordingly, the below descriptions related to texture mapping operations are for the sake of explanation, and are not intended to be limiting.

FIG. 1 illustrates an example device 100 that includes a streaming processor 110 and a texture processor 170, consistent with disclosed embodiments. As illustrated in FIG. 1, the streaming processor 110 includes a sequencer 130, a wave queue 140, an execution unit 145, a GPR 150, a pixel interpolation unit 160, a multiplexer 165, and a texture load unit 180. The streaming processor 110 can receive an input 120, and can send an output 190. The streaming processor 110 can also send to and receive from the texture processor 170.

The components depicted of device 100 in FIG. 1 are merely for the sake of explanation and are not intended to be limiting. For example, the device 100, the streaming processor 110, and/or the texture processor 170 may include fewer or additional components not shown in FIG. 1. For instance, the device 100 may include other components of a GPU pipeline, as well as other processors, memories, and other types of computer components. The streaming processor 110 may include other components, such as an instruction cache, a context register, a local memory, a clock component, a power component, a dispatcher, a high-level task manager, etc., and may be able to communicate with other components, such as a high-level sequencer, memories, other GPU components, other processors, etc.

In some embodiments, the input 120 to the streaming processor 110 can include attributes of an operation and/or a packet that describes an operation, such as a texture operation. For example, the input 120 can be received from a high-level sequencer, a high-level task manager of the streaming processor 110, another GPU component, and/or another streaming processor 110 component, and the input 120 can be instructions and/or texture attributes, including, for example i/j barycentric coefficient data.

In further embodiments, the sequencer 130 can be any type of component that can receive the input 120, allocate wave slots, allocate GPR space, and utilize the pixel interpolation unit 160. For example, the sequencer 130 can receive the input 120, can generate a virtual wave slot, can allocate a physical wave slot, can allocate GPR space, and/or can defer allocating GPR space for certain operations, as described in further detail below.

In additional embodiments, the wave queue 140 can be a storage component with multiple slots to be used to schedule work for the execution unit 145. In some implementations, the wave queue 140 may have a set number of physical wave slots available to be used for scheduling operations of the streaming processor 110. Thus, if all of the physical wave slots are allocated, no additional operations that require a physical wave slot can proceed until a physical wave slot becomes available.

In further embodiments, the execution unit 145 can be any type of one or more processing components and circuits. For example, the execution unit 145 can include one or more ALUs, floating-point units, address generation units, load-store units, branch execution units, registers, and the like. The execution unit 145 may perform operations in sequence corresponding to the physical wave slots of the wave queue 140 and/or suspend waves while waiting for one or more prerequisite operations for the wave to complete (e.g., memory operations, loading texture data, etc.). In some implementations, the execution unit 145 can read data from and write data to the GPR 150. In further implementations, the execution unit 145 can send texture requests to the texture load unit 180.

In some embodiments, the GPR 150 can be a storage component that can be used to store data for the streaming processor 110, such as, for example, texture attributes (e.g., u/v coordinates or i/j coefficient data). In some implementations, the GPR 150 can receive the texture attributes from the sequencer 130 (e.g., i/j coefficient data), the execution unit 145 (e.g., u/v coordinates), and/or the texture load unit 180. In further implementations, the GPR 150 can provide texture attributes to the execution unit 145 and/or to the texture load unit 180.

In further embodiments, the pixel interpolation unit 160 can be any type of component that can issue initial texture samples instructions to the texture processor 170. In some implementations, the pixel interpolation unit 160 can be part of the sequencer 130, while, in other implementations, the pixel interpolation unit 160 can be a separate component. As used herein, in some examples, initial texture sample instructions can refer to instructions generated by a pixel interpolation unit (e.g., of a simple shader operation) and/or instructions generated without using an execution unit of a streaming processor. The initial texture sample instructions can include instructions that cause a texture processor to perform, for example, texture mapping and filtering.

In additional embodiments, the multiplexer 165 can be any type of component that can combine two signals into one signal (e.g., combines texture sample instructions from the pixel interpolation unit 160 and the texture load 180 into one signal to the texture processor 170).

In some embodiments, the texture processor 170 can be a component that receives initial texture samples instructions and texture sample instructions, performs texture mapping, performs texture filtering, and/or returns texture mapped data to the texture load unit 180.

In further embodiments, the texture load unit 180 can be a component that receives texture requests from the execution unit 145, retrieves texture attributes from the GPR 150, determines texture sample instructions (e.g., based on the texture requests and the texture attributes), sends texture sample instructions to the texture processor 170, receives texture mapped data from the texture processor 170, and outputs (e.g., the output 190) the texture mapped data (e.g., to another component, to the GPR 150, etc.). As used herein, in some examples, texture sample instructions can refer to instructions generated using data processed by an execution unit of a streaming processor. The texture sample instructions can include instructions that cause a texture processor to perform, for example, texture mapping and filtering.

In additional embodiments, the output 190 can be output from the streaming processor 110, the texture load unit 180, the GPR 150, and/or another component of the streaming processor 110. The output 190 can include, for example, texture mapped data. In some embodiments, the output 190 can be texture mapped data that is used for post-processing operations. In further embodiments, post-processing operations can be performed within the streaming processor 110, and the output 190 can be post-processed texture mapped data that is pushed to downstream components in a GPU pipeline.

Figure 2:
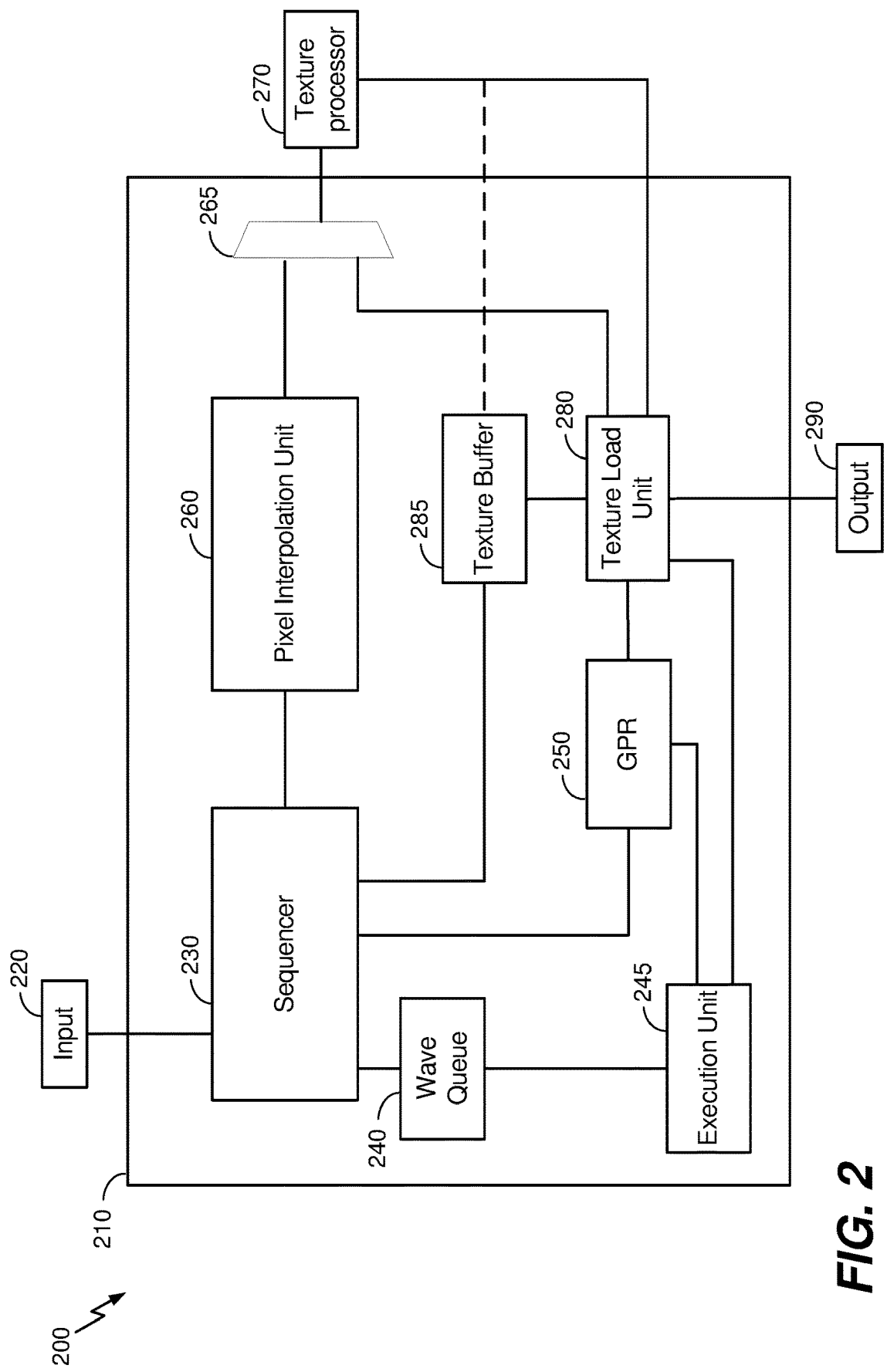
FIG. 2 illustrates an example device that includes a streaming processor and a texture processor, consistent with disclosed embodiments.

FIG. 2 illustrates an example device 200 that includes a streaming processor 210 and a texture processor 270, consistent with disclosed embodiments. As illustrated in FIG. 2, the streaming processor 210 includes a sequencer 230, a wave queue 240, an execution unit 245, a GPR 250, a pixel interpolation unit 260, a multiplexer 265, a texture load unit 280, and a texture buffer 285. The streaming processor 210 can receive an input 220, and can send an output 290. The streaming processor 210 can also send to and receive from the texture processor 270.

The components depicted of device 200 in FIG. 2 are merely for the sake of explanation and are not intended to be limiting. For example, the device 200, the streaming processor 210, and/or the texture processor 270 may include fewer or additional components not shown in FIG. 2. For instance, the device 200 may include other components of a GPU pipeline, as well as other processors, memories, and other types of computer components. The streaming processor 210 may include other components, such as an instruction cache, a context register, a local memory, a clock component, a power component, a dispatcher, a high-level task manager, etc., and be able to communicate with other components, such as a high-level sequencer, memories, other GPU components, other processors, etc.

In some embodiments, the input 220 to the streaming processor 210 can include attributes of an operation and/or a packet that describes an operation, such as a texture operation. For example, the input 220 can be received from a high-level sequencer, a high-level task manager of the streaming processor 210, another GPU component, and/or another streaming processor 210 component, and the input 220 can be instructions and/or texture attributes, including, for example, i/j barycentric coefficient data.

In further embodiments, the sequencer 230 can be any type of component that can receive the input 220, allocate wave slots, allocate GPR space, utilize the pixel interpolation unit 260, and store data to the texture buffer 285 (e.g., virtual wave slot data). For example, the sequencer 230 can receive the input 220, can generate a virtual wave slot, can store data for the virtual wave slot in the texture buffer 285 (e.g., if no physical wave slots are available), can allocate a physical wave slot, can allocate GPR space, and/or can defer allocating GPR space and physical wave slots for certain operations, as described in further detail below.

In additional embodiments, the wave queue 240 can be a storage component with multiple slots to be used to schedule work for the execution unit 245.

In further embodiments, the execution unit 245 can be any type of one or more processing components and circuits. For example, the execution unit 245 can include one or more ALUs, floating-point units, address generation units, load-store units, branch execution units, registers, and the like. The execution unit 245 may perform operations in sequence corresponding to the physical wave slots of the wave queue 240 and/or suspend waves while waiting for one or more prerequisite operations for the wave to complete (e.g., memory operations, loading texture data, etc.). In some implementations, the execution unit 245 can read data from and write data to the GPR 250. In further implementations, the execution unit 245 can send texture requests to the texture load unit 280.

In some embodiments, the GPR 250 can be a storage component that can be used to store data for the streaming processor 210, such as, for example, texture attributes (e.g., u/v coordinates or i/j coefficient data). In some implementations, the GPR 250 can receive the texture attributes from the sequencer 230, the execution unit 245, and/or the texture load unit 280. In further implementations, the GPR 250 can provide texture attributes to the execution unit 245 and/or to the texture load unit 280.

In further embodiments, the pixel interpolation unit 260 can be any type of component that can issue initial texture samples to the texture processor 179. In some implementations, the pixel interpolation unit 260 can be part of the sequencer 230, while, in other implementations, the pixel interpolation unit 260 can be a separate component.

In additional embodiments, the multiplexer 265 can be any type of component that can combine two signals into one signal (e.g., combines texture sample instructions from the pixel interpolation unit 260 and the texture load 280 into one signal to the texture processor 270).

In some embodiments, the texture processor 270 can be a component that receives initial texture samples instructions and texture sample instructions, performs texture mapping, performs texture filtering, and/or returns texture mapped data to the texture load unit 280.

In further embodiments, the texture load unit 280 can be a component that receives texture requests from the execution unit 245, retrieves texture attributes from the GPR 250 and the texture buffer 285, determines texture sample instructions (e.g., based on the texture requests and the texture attributes), sends texture sample instructions to the texture processor 270, receives texture mapped data from the texture processor 270, and outputs (e.g., the output 290) the texture mapped data (e.g., to another component, to the GPR 250, etc.).

In additional embodiments, the texture buffer 285 can be a storage component that can be used to store data for the streaming processor 210, such as, for example, texture attributes (e.g., u/v coordinates or i/j coefficient data), virtual wave slot data, texture mapped data, and the like. In some implementations, the texture buffer 285 can receive the texture attributes and/or virtual wave slot data from the sequencer 230, and/or the texture load unit 280. In further implementations, the texture buffer 285 can receive texture mapped data from the texture processor 270 and/or the texture load unit 280. For example, if a virtual wave slot has not been converted to a physical wave slot, as discussed in further detail below, the texture mapped data received from the texture processor 270 may be stored in the texture buffer 285 until a physical wave slot is available. In additional implementations, the texture buffer 285 can provide texture attributes and/or virtual wave slot data to, for example, the sequencer 230 once a physical wave slot becomes available and a virtual wave slot can be converted to a physical wave slot. In some implementations, the texture buffer can provide texture attributes, virtual wave slot data, and/or texture mapped data to the texture load unit 280, for example, when a physical wave slot becomes available after the texture mapped data is received from the texture processor 270.

In additional embodiments, the output 290 can be output from the streaming processor 210, the texture load unit 280, and/or another component of the streaming processor 210. The output 290 can include, for example, texture mapped data. In some embodiments, the output 290 can be texture mapped data that is used for post-processing operations. In further embodiments, post-processing operations can be performed within the streaming processor 210, and the output 290 can be post-processed texture mapped data that is pushed to downstream components in a GPU pipeline.

Figure 3:
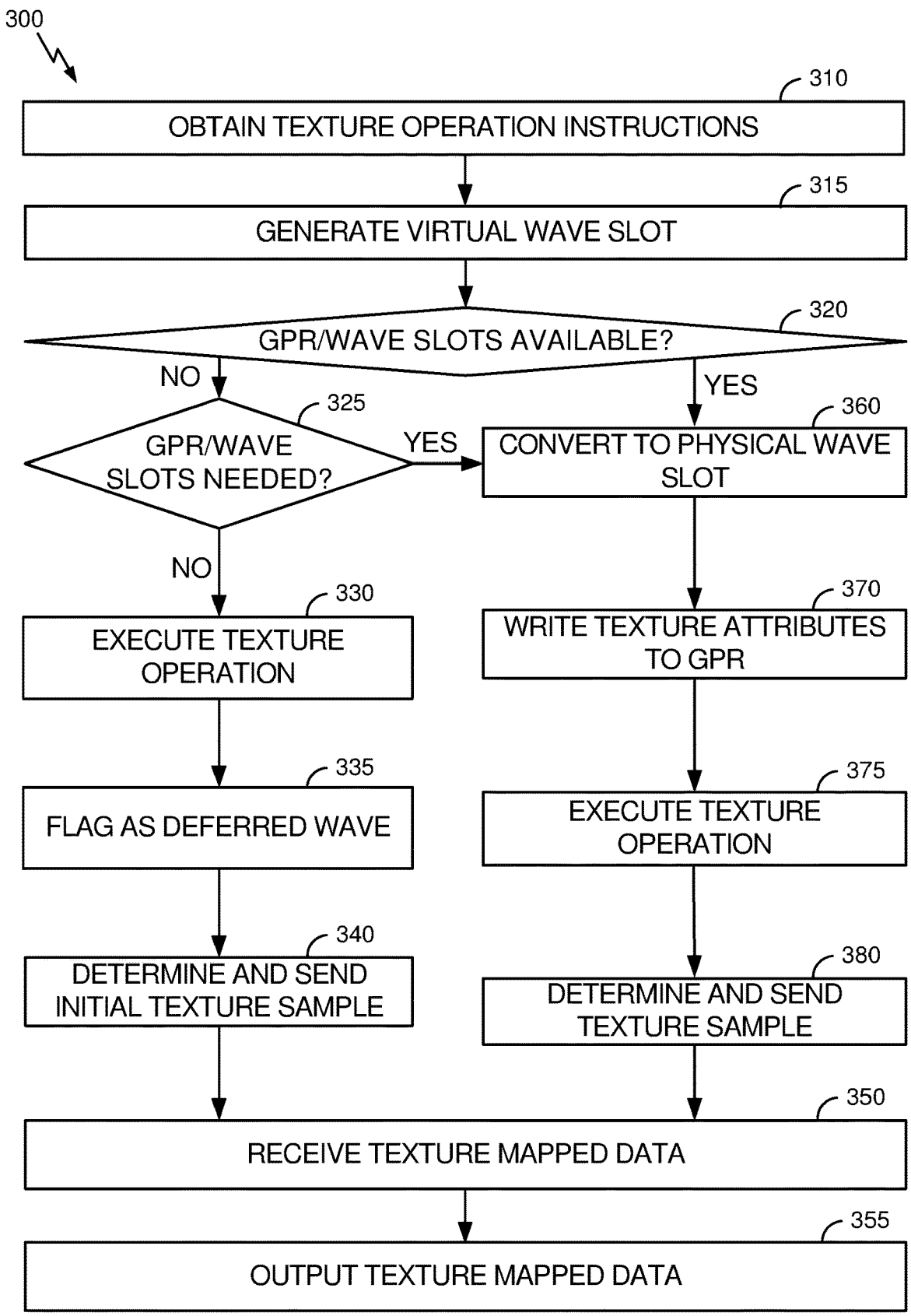
FIG. 3 is a flowchart of an example process for allocating general purpose register space and wave slots on a streaming processor, consistent with disclosed embodiments.

FIG. 3 is a flowchart of an example process 300 for allocating general purpose register space and wave slots on a streaming processor, consistent with disclosed embodiments. In some embodiments, the process 300 can be performed using any type of computing device, such as, for example, a personal computer, a wireless communication device, a video game console, an augmented reality headset, a virtual reality headset, a mixed reality headset, and the like. In further embodiments, the process 300 can be performed by a GPU of the computing device. In still further embodiments, the process 300 can be performed using a streaming processor and texture processor of a GPU of the computing device. For example, the process 300 can be performed using the streaming processor 110 and the texture processor 170 or the streaming processor 210 and the texture processor 270.

The process 300 can begin in block 310 when texture operation instructions are obtained by the computing device (e.g., by a streaming processor of a GPU of the computing device). In some embodiments, the texture operation instructions can correspond to and/or include texture attributes. In further embodiments, the texture operation instructions can be processed to determine texture attributes (e.g., i/j for two-dimensional (2D), or i/j/k for 3D, barycentric coefficient data). In still further embodiments, the texture operation instructions can be processed by a complier to generate execution threads for the computing device, generate execution waves (of multiple threads) for the texture operations, and include end of sample instructions indicators in the threads to indicate when a wave is complete for a texture sample. In additional embodiments, the texture operation instructions can include a packet that describes the texture operations to be performed.

In block 315, the computing device can generate a virtual wave slot for an execution wave of a texture operation of the texture operation instructions. In some embodiments, the virtual wave slot can control information associated with a wave. For example, the virtual wave slot could hold the current instruction pointer to a shader program associated with the wave, an execution mask used to determine active threads in a wave, and/or pointers to the bases of storage (whether currently available or not) associated with the wave, and the like.

In block 320, the computing device can determine whether there is GPR space and/or a physical wave slot available for the texture operation. For example, the computing device can perform the determination based on the amount of GPR space available, the number of physical wave slots available, the size/number of the texture attributes associated with the texture operation, the number of execution threads associated with the texture operation, the number of execution waves associated with the texture operation, etc.

If, in block 320, the computing device determines that there is insufficient GPR space and/or insufficient physical wave slots available (block 320—NO), the process can proceed to block 325. In block 325, the computing device can determine whether GPR space and/or physical wave slots are needed for the execution wave of the texture operation. For example, the computing device can determine that GPR space and a physical wave slot are not needed because the execution wave corresponds to a simple shader operation (e.g., the operation is a 2D operation and includes i/j coefficient data). As an additional example, the computing device can determine that GPR space and a physical wave slot are needed because the texture operation corresponds to a more complex operation (e.g., the operation is a 3D operation and includes i/j/k coefficient data, computes bias (e.g., based on input k), performs color composition, requires determination of a w coordinate, etc.).

If, in block 325, the computing device determines that GPR space and/or a physical wave slot is not needed for the first wave (block 325—NO), the process 300 can proceed to block 330. In block 330, the computing device can execute the texture operation without initially allocating or using GPR space and/or a physical wave slot. For example, the texture operation can be a simple 2D shader operation that uses i/j coefficient data (texture attributes) and data from local memory to determine u/v coordinates. In some implementation, a simple 2D shader operation can be performed using a pixel interpolation unit instead of an execution unit of the computing device. Thus, because the texture operation can be performed using the pixel interpolation unit, a physical wave slot of the execution unit and GPR space may not need to be allocated at the current stage, although the physical wave slot and/or GPR space may be needed at a later stage for the texture operation (e.g., for post-processing operations).

In block 335, the computing device can flag the execution wave for the texture operation as a deferred wave. As used herein, a deferred wave is a wave for an operation that does not currently have a physical wave slot allocated. In some implementations, the flag can be included in an initial texture sample instruction (e.g., as generated in block 340) that is sent to the texture processor, and received in the texture mapped data received from the texture processor (e.g., as in block 350). Thus, the flag can be propagated through the texture processor.

In some embodiments, the computing device can maintain a deferred wave capacity counter to manage the number of deferred waves currently being maintained. For example, when a new deferred wave is flagged, the deferred wave capacity counter can be adjusted (e.g., decremented) to indicate that there is an additional deferred wave being maintained. When an end of sample instruction is processed for a deferred wave, the deferred wave capacity counter can be adjusted (e.g., incremented) to indicate that there is one fewer deferred wave being maintained.

In further embodiments, the computing device can maintain a deferred wave queue (e.g., in a first in, first out (FIFO) buffer stored in a sequencer) with a write/read pointer to save the coverage mask (i.e., the portion of a pixel covered by a triangle) and the allocation state of the coverage mask. The allocation state can indicate whether a physical wave slot has been allocated or whether allocation of a physical wave slot is pending. Upon generation of the deferred wave, the allocation of a physical wave slot is pending until a physical wave slot becomes available. In some embodiments, the first deferred wave in the deferred wave queue may have priority for the next physical wave slot that becomes available.

In block 340, the computing device can generate and send an initial texture sample instruction to a texture processor. In some embodiments, the initial texture sample instruction can be based on the processing of the pixel interpolation unit (e.g., of a simple shader operation) and can include instructions that cause a texture processor to perform, for example, texture mapping and filtering. In further embodiments, the initial texture sample instruction can include a flag that indicates that the initial texture sample instruction is associated with a deferred wave.

In some embodiments, while the texture processor is processing the initial sample instructions, if a physical wave slot and/or GPR space becomes available, the computing device can allocate the available physical wave slot to a deferred wave, allocate GPR space, update the physical wave slot to the coverage mask of the deferred wave, and change the allocation status in the deferred wave queue to allocated.

In 350, the computing device can receive texture mapped data from the texture processor. For example, a streaming processor of a GPU of the computing device can receive the data from a texture processor of the GPU. In some embodiments, the received data can include a flag indicating that the data corresponds to a deferred wave. In further embodiments, if the data is associated with an end of sample instruction, a deferred wave capacity counter can be adjusted.

In 355, the computing device can output the texture mapped data. In some embodiments, the computing device can output the texture mapped data to the GPR, where post-processing operations can be performed. In such embodiments, GPR space and a physical wave slot may need to be allocated prior to the post-processing operations. Accordingly, if a physical wave slot has not become available, GPR space is not available, and/or the allocation of the deferred wave remains as pending, the computing device may have to wait until a physical wave slot and/or GPR space becomes available to allocate the physical wave slot for post-processing of the texture mapped data. In further embodiments, the texture mapped data (e.g., after post-processing operations have been performed) can be output from the streaming processor to other downstream components of the GPU. In still further embodiments, the texture mapped data can correspond to an image frame that is output to a display of the computing device.

Returning to block 320, if, in block 320, the computing device determines that GPR space and a physical wave slot are available (block 320—YES), the process can proceed to block 360. Or, returning to block 325, if the computing device determines that GPR space and a physical wave slot are needed (block 325—YES) (e.g., the operation is a 3D operation and includes i/j/k coefficient data, computes bias (e.g., based on input k), performs color composition, requires determination of a w coordinate, etc.), the process can proceed to block 360, but may have to wait until GPR space and/or a physical wave slot are available.

In block 360 and block 370, the computing device can allocate a physical wave slot and GPR space for the texture operation. In block 360, the computing device can allocate a physical wave slot by converting the virtual wave slot to the physical wave slot. For example, the computing device can update the physical wave slot to the coverage mask of the virtual wave slot.

In block 370, the computing device can write the texture attributes for the texture operation (e.g., i/j/k coefficient data) to the GPR.

In block 375, the computing device can execute the texture operation. In some embodiments, the computing device can execute the texture operation using an execution unit (e.g., an ALU) of the computing device. In further embodiments, the texture operation can be executed using the texture attributes, which the execution unit can retrieve from the GPR. For example, the texture operation can be a 3D shader operation that uses i/j/k coefficient data (texture attributes retrieved from the GPR) and data from local memory to determine u/v/w coordinates. The execution unit can then store the determined u/v/w coordinates to the GPR. Based on the texture operation, the execution unit can send a texture request corresponding to the texture operation to a texture load unit, and the texture load unit can retrieve the i/j/k coefficient data and u/v/w coordinates from the GPR. Using the retrieved data, the texture load unit can generate texture sample instructions.

In block 380, the computing device can send the texture sample instructions to the texture processor. In some embodiments, the texture sample instructions can be based on the processing of the execution unit (e.g., of a more complex operation) and can include instructions that cause a texture processor to perform texture mapping and filtering.

In block 350, the computing device can receive the texture mapped data, as described above.

Figure 4:
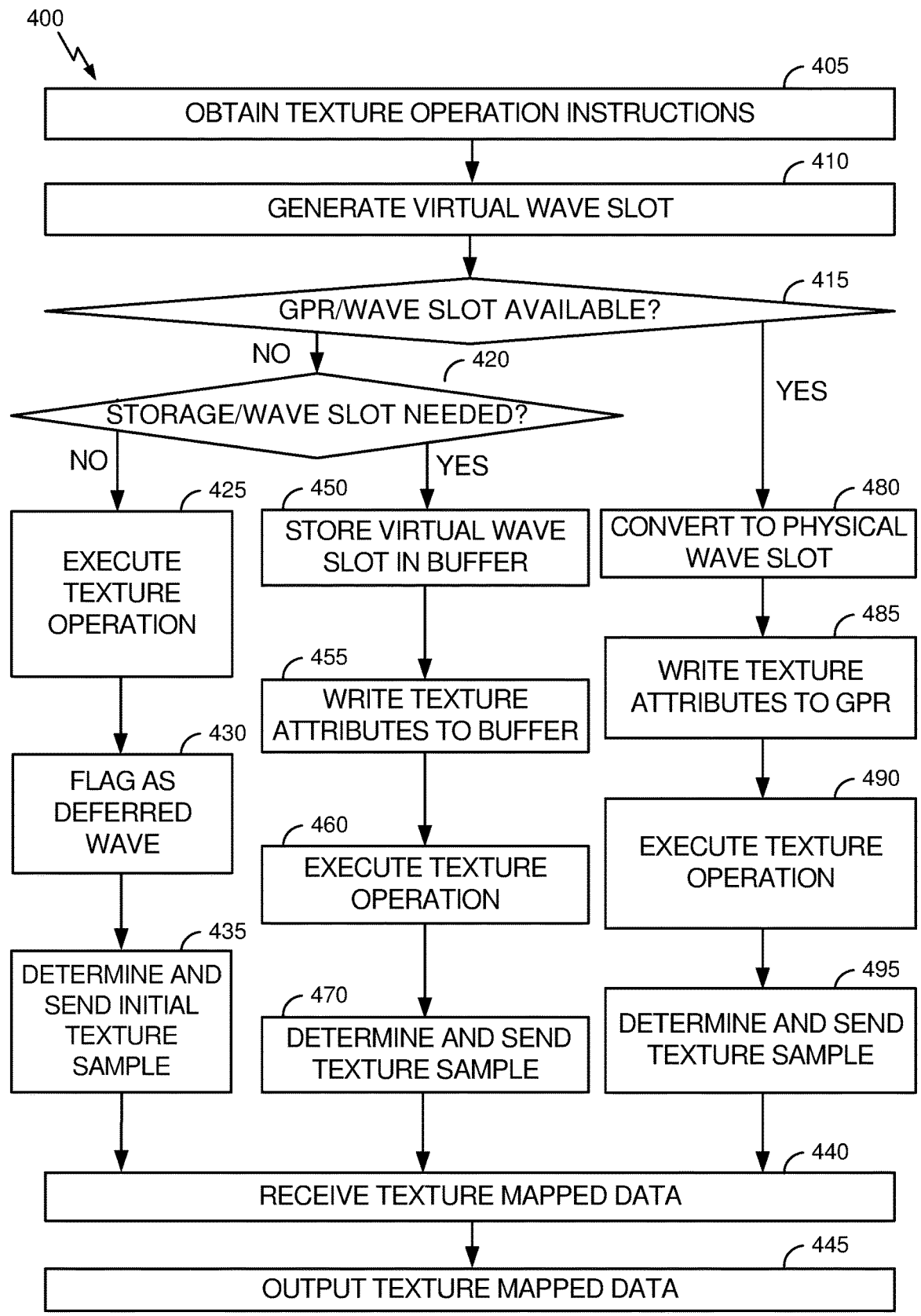
FIG. 4 is a flowchart of an example process for allocating general purpose register space and wave slots on a streaming processor, consistent with disclosed embodiments.

FIG. 4 is a flowchart of an example process 400 for allocating general purpose register space and wave slots on a streaming processor, consistent with disclosed embodiments. In some embodiments, the process 400 can be performed using any type of computing device, such as, for example, a personal computer, a wireless communication device, a video game console, an augmented reality headset, a virtual reality headset, a mixed reality headset, and the like. In further embodiments, the process 400 can be performed by a GPU of the computing device. In still further embodiments, the process 400 can be performed using a streaming processor and texture processor of a GPU of the computing device. For example, the process 400 can be performed using the streaming processor 110 and the texture processor 170 or the streaming processor 210 and the texture processor 270.

The process 400 can begin in block 405 when texture operation instructions are obtained by the computing device (e.g., by a streaming processor of a GPU of the computing device). In some embodiments, the texture operation instructions can correspond to and/or include texture attributes. In further embodiments, the texture operation instructions can be processed to determine texture attributes (e.g., i/j for 2D, or i/j/k for 3D, barycentric coefficient data). In still further embodiments, the texture operation instructions can be processed by a complier to generate execution threads for the computing device, generate execution waves (of multiple threads) for the texture operations, and include end of sample instructions indicators in the threads to indicate when a wave is complete for a texture sample. In additional embodiments, the texture operation instructions can include a packet that describes the texture operations to be performed.

In block 410, the computing device can generate a virtual wave slot for an execution wave of a texture operation of the texture operation instructions.

In block 415, the computing device can determine whether there is GPR space and/or physical wave slot available for the texture operation. For example, the computing device can perform the determination based on the amount of GPR space available, the number of physical wave slots available, the size/number of the texture attributes associated with the texture operation, the number of execution threads associated with the texture operation, the number of execution waves associated with the texture operation, etc.

If, in block 415, the computing device determines that there is insufficient GPR space and/or insufficient physical wave slots available (block 415—NO), the process can proceed to block 420. In block 420, the computing device can determine whether buffer storage space and/or wave slots are needed for the execution wave of the texture operation.

If, in block 420, the computing device determines that buffer storage space and/or a wave slot is not needed for the execution wave (block 420—NO), the process 400 can proceed to block 425. In block 425, the computing device can execute the texture operation without initially allocating or using GPR space and/or a physical wave slot. In some implementations, a simple texture operation can be performed using a pixel interpolation unit instead of an execution unit of the computing device. Thus, because the texture operation can be performed using the pixel interpolation unit, a physical wave slot of the execution unit and GPR space may not need to be allocated at the current stage, although the physical wave slot and/or GPR space may be needed at a later stage for the texture operation (e.g., for post-processing operations).

In block 430, the computing device can flag the execution wave for the texture operation as a deferred wave. In some implementations, the flag be an indication that the texture operation corresponds to a deferred wave. In further implementations, the flag can be included in an initial texture sample instruction (e.g., as generated in block 435) that is sent to the texture processor and received in the texture mapped data received from the texture processor (e.g., as in block 440). Thus, the flag can be propagated through the texture processor.

In some embodiments, the computing device can maintain a deferred wave capacity counter, to manage the number of deferred waves currently being maintained, and a deferred wave queue with a write/read pointer to save the coverage mask (i.e., the portion of a pixel covered by a triangle) and the allocation state of the coverage mask, as described above.

In block 435, the computing device can generate and send initial texture sample instructions to a texture processor. In some embodiments, the initial texture sample instructions can be based on the processing of the pixel interpolation unit (e.g., of a simple shader operation) and can include instructions that cause a texture processor to perform texture mapping and filtering. In further embodiments, the initial texture sample instructions can include a flag indicated that the initial texture sample instructions are associated with a deferred wave.

In some embodiments, while the texture processor is processing the initial sample instructions, if a physical wave slot and/or GPR space become available, the computing device can allocate the available physical wave slot to a deferred wave, allocate GPR space, update the physical wave slot to the coverage mask of the deferred wave, and change the allocation status in the deferred wave queue to allocated.

In 440, the computing device can receive texture mapped data from the texture processor. For example, a streaming processor of a GPU of the computing device can receive the data from a texture processor of the GPU. In some embodiments, the received data can include a flag indicating that the data corresponds to a deferred wave. In further embodiments, if the data is associated with an end of sample instruction, a deferred wave capacity counter can be adjusted. In some implementations, the received texture mapped data can be received by a texture load unit (e.g., the texture load unit 280 shown in FIG. 2). For example, if a virtual wave slot corresponding to the texture mapped data is converted to a physical wave slot prior to when the texture mapped data is received by the streaming processor, the texture mapped data can be received by a texture load unit. In other implementations, the received texture mapped data can be received by a texture buffer (e.g., the texture buffer 285 shown in FIG. 2). For example, if a virtual wave slot corresponding to the texture mapped data has not been converted to a physical wave slot prior to when the texture mapped data is received by the streaming processor, the texture mapped data can be received and stored in a texture buffer until a physical wave slot becomes available.

In 445, the computing device can output the texture mapped data. In some embodiments, the computing device can output the texture mapped data to the GPR, where post-processing operations can be performed. In such embodiments, GPR space and a physical wave slot may need to be allocated prior to the post-processing operations. Accordingly, if a physical wave slot has not become available, sufficient GPR space is not available, and/or the allocation of the deferred wave remains as pending, the computing device may have to wait until a physical wave slot and/or GPR space become available to allocate the physical wave slot for post-processing of the texture mapped data. In further embodiments, the texture mapped data (e.g., after post-processing operations have been performed) can be output from the streaming processor to other downstream components of the GPU. In still further embodiments, the texture mapped data can correspond to an image frame of graphics content that is output to a display of the computing device.

Returning to block 420, if the computing device determines that buffer storage space and a wave slot are needed (block 420—YES) the process can proceed to block 450.

In block 450, the computing device can store the virtual wave slot data in a texture buffer.

In block 455, the computing device can write the texture attributes for the texture operation to the texture buffer.

Accordingly, as described above, the texture buffer can allow the streaming processor to continue to receive texture operations instead of waiting for a wave slot or GPR space for the current operation. Additionally, the computing device can continue to send initial texture sample instructions (e.g., as in block 435) to the texture processor.

In block 460, the computing device can execute the texture operation. In some embodiments, the computing device can execute the texture operation using an execution unit (e.g., an ALU) of the computing device. In further embodiments, the texture operation can be executed using the texture attributes, which the execution unit can retrieve from the texture buffer. The execution unit can then store the determined u/v/w coordinates to the texture buffer or the GPR (if space is available). Based on the texture operation, the execution unit can send a texture request corresponding to the texture operation to a texture load unit, and the texture load unit can retrieve the texture attributes and coordinates stored by the execution unit from the texture buffer (or the GPR). Using the retrieved data, the texture load unit can determine texture sample instructions.

In block 470, the computing device can determine and send the texture sample instructions to the texture processor. In some embodiments, the texture sample instructions can be based on the processing of the execution unit (e.g., of a more complex operation) and can include instructions that cause a texture processor to perform texture mapping and filtering. In various embodiments, the virtual wave slot can be converted to physical wave slot and/or the texture attributes in the texture buffer can be written to the GPR prior to block 460, while block 460 is being performed, after block 460, before block 470, while block 470 is being performed, after block 470, after block 440 when the texture mapped data is received from the texture processor, etc.

Returning to block 415, if, in block 415, the computing device determines that GPR space and a physical wave slot are available (block 415—YES), the process can proceed to block 480.

In block 480 and block 485, the computing device can allocate a physical wave slot and GPR space for the texture operation. In block 480, the computing device can allocate a physical wave slot by converting the virtual wave slot to the physical wave slot. For example, the computing device can update the physical wave slot to the coverage mask of the virtual wave slot.

In block 485, the computing device can write the texture attributes for the texture operation (e.g., i/j/k coefficient data) to the GPR.

In block 490, the computing device can execute the texture operation. In some embodiments, the computing device can execute the texture operation using an execution unit (e.g., an ALU) of the computing device. The execution unit can then store the determined coordinates to the GPR. Based on the texture operation, the execution unit can send a texture request corresponding to the texture operation to a texture load unit.

In block 495, at the texture load unit, the computing device can determine and send the texture sample instructions to the texture processor. In some embodiments, the texture sample instructions can be based on the coordinates stored by the execution unit (e.g., of a more complex operation) and can include instructions that cause a texture processor to perform texture mapping and filtering.

In block 440, the computing device can receive the texture mapped data, as described above.

Figure 5:
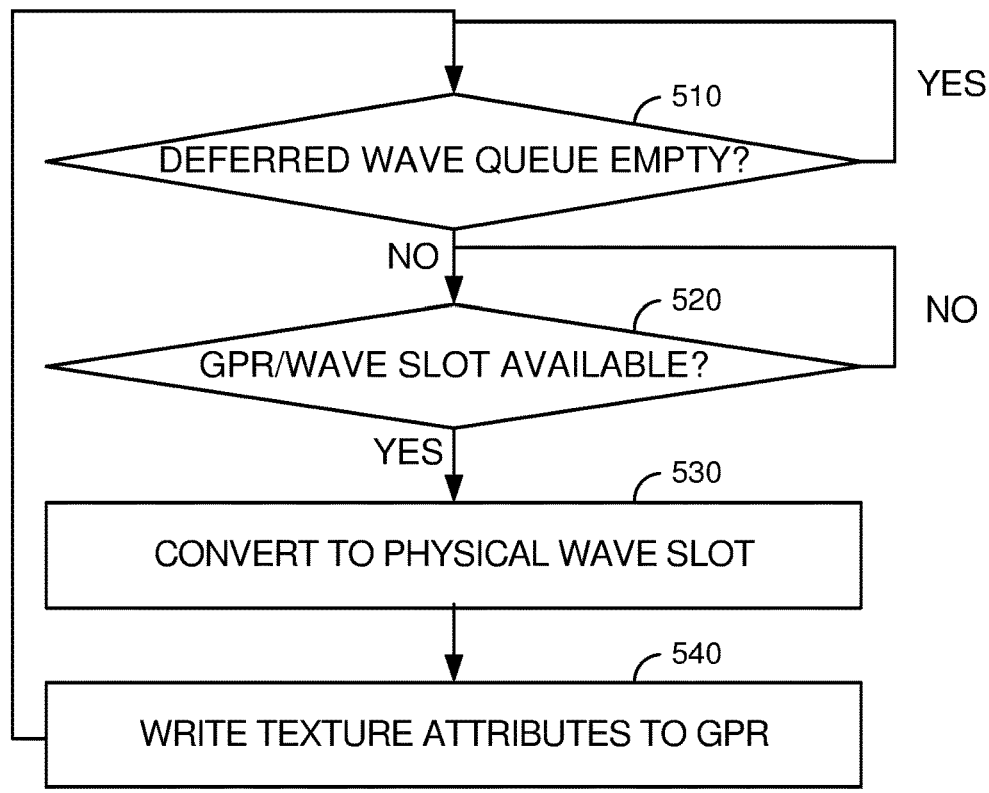
FIG. 5 is a flowchart of an example process for asynchronously converting virtual wave slots to physical wave slots, consistent with disclosed embodiments.

FIG. 5 is a flowchart of an example process 500 for asynchronously converting virtual wave slots to physical wave slots, consistent with disclosed embodiments. In some embodiments, the process 500 can be performed using any type of computing device, such as, for example, a personal computer, a wireless communication device, a video game console, an augmented reality headset, a virtual reality headset, a mixed reality headset, and the like. In further embodiments, the process 500 can be performed by a GPU of the computing device. In still further embodiments, the process 500 can be performed using a streaming processor and a texture processor of a GPU of the computing device. For example, the process 500 can be performed using the streaming processor 110 and the texture processor 170 or the streaming processor 210 and the texture processor 270. Additionally, the process 500 can be performed asynchronously in combination with the process 300 described in FIG. 3 and/or with the process 400 described in FIG. 4.

The process can begin in block 510. In block 510, the computing device can determine if a deferred wave queue is empty. If the deferred wave queue is empty (block 510—YES), the process can return to block 510. Accordingly, the computing device can repeatedly and/or continually monitor the wave queue until it is no longer empty. If the deferred wave queue is not empty (block 510—NO) the process can proceed to block 520.

In block 520, the computing device can determine whether there is GPR space and/or physical wave slot available for the texture operation in a priority position in the deferred wave queue (e.g., the first wave slot in a FIFO queue). For example, the computing device can perform the determination based on the amount of GPR space available, the number of physical wave slots available, the size/number of the texture attributes associated with the texture operation, the number of execution threads associated with the texture operation, the number of execution waves associated with the texture operation, etc.

If, in block 520, the computing device determines that there is insufficient GPR space and/or insufficient physical wave slots available (block 520—NO), the process can return to block 520. Accordingly, the computing device can repeatedly and/or continually monitor the GPR space and physical wave slots until available for the texture operation in the priority position.

If, in block 520, the computing device determines that GPR space and a physical wave slot are available (block 520—YES), the process can proceed to block 530.

In block 530 and block 540, the computing device can allocate a physical wave slot and GPR space for the texture operation. In block 480, the computing device can allocate a physical wave slot by converting the virtual wave slot to the physical wave slot. For example, the computing device can update the physical wave slot to the coverage mask of the virtual wave slot and remove the virtual wave from the deferred wave queue.

In block 540, the computing device can write the texture attributes for the texture operation (e.g., i/j/k coefficient data) to the GPR.

Thus, the deferred waves can be converted from virtual wave slots to physical wave slots asynchronously from the processes described in FIGS. 3 and 4. For example, a deferred wave can be converted to a physical wave slot prior to determining and sending an initial texture sample to a texture processor (e.g., 340 in FIG. 3 or 435 in FIG. 4) or the deferred wave can be converted to a physical wave slot after the texture mapped data is received from the texture processor (e.g., 350 in FIG. 3 or 440 in FIG. 4) but prior to performing post processing on the texture mapped data, and, in some examples, the texture mapped data can be stored in a texture buffer. In another example, a deferred wave can be converted to a physical wave slot prior to executing texture operations at an execution unit (e.g., 460 in FIG. 4) and/or prior to determining and sending a texture sample to a texture processor (e.g., 470 in FIG. 4).

In some embodiments, a physical wave slot and GPR space may be needed for post processing. Accordingly, in such embodiments, the post processing for a deferred wave texture operation may not occur until after block 530 and block 540 are performed. In further embodiments, such as embodiments corresponding to FIG. 1 that do not utilize a texture buffer, a physical wave slot and GPR space may be needed prior to executing a texture operation. Accordingly, in such embodiments, the texture operation for a deferred wave may not be executed until after block 530 and block 540 are performed.

Figure 6:
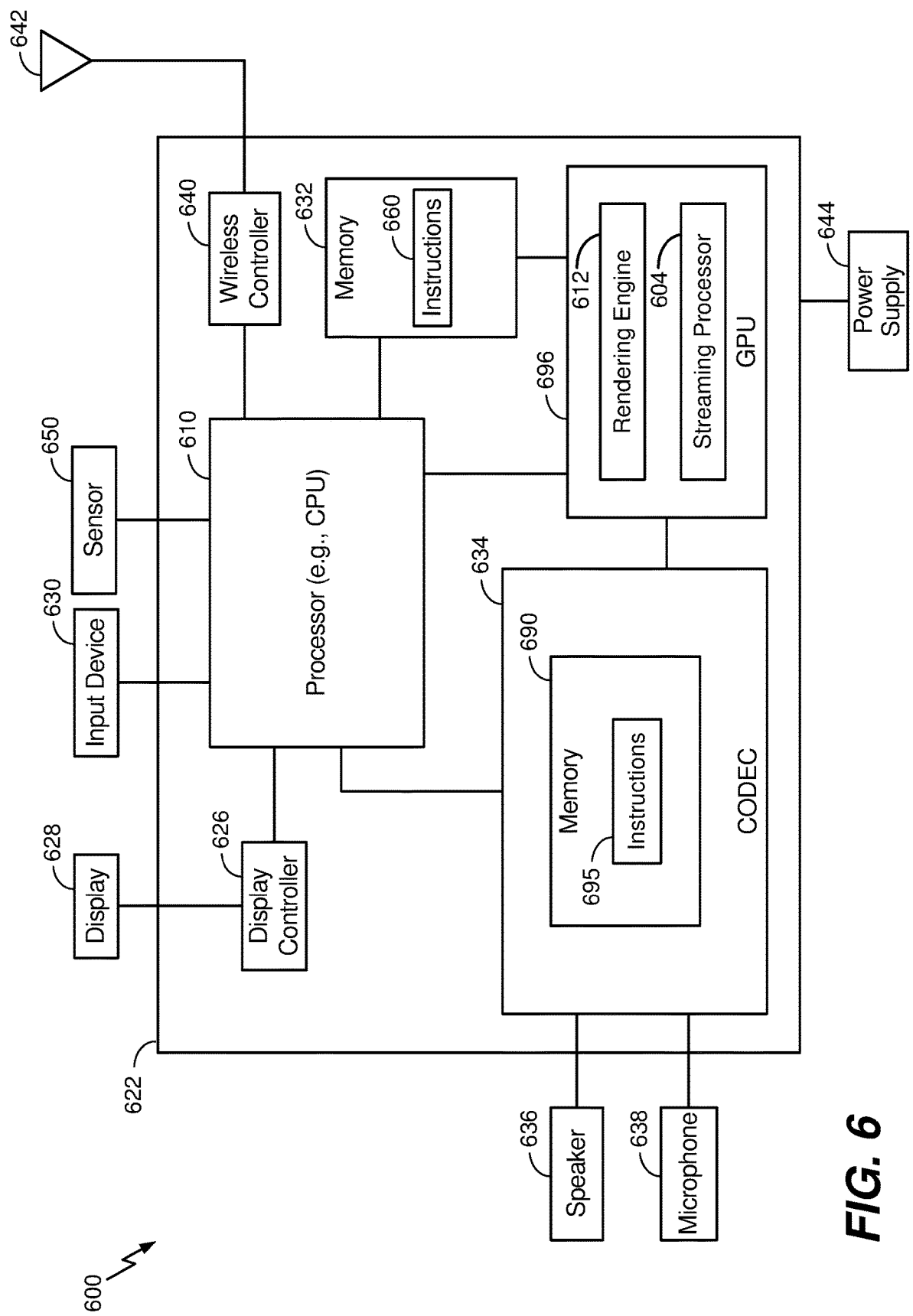
FIG. 6 is a block diagram illustrating an example device having a graphics processor with at least one streaming processor, consistent with disclosed embodiments.

FIG. 6 is a block diagram illustrating an example device having a graphics processor with at least one streaming processor, consistent with disclosed embodiments. In FIG. 6, an example diagram of an electronic device that can perform graphics processing is depicted and generally designated as an electronic device 600. The electronic device 600 may correspond to a mobile device (e.g., a wireless communication device, such as a cellular handset), a computer (e.g., a server, a laptop computer, a tablet computer, or a desktop computer), an access point, a base station, a wearable electronic device (e.g., a personal camera, a head-mounted display, a VR headset, an AR headset, smart glasses, or a smartwatch), a vehicle control system or console (e.g., an advanced driver assistance system), an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 600 includes one or more processors, such as a processor 610 and a graphics processing unit (GPU) 696. The processor 610 may include a central processing unit (CPU), a digital signal processor (DSP), another processing device, or a combination thereof. In the example of FIG. 6, the GPU 696 may include the rendering engine 612 and the streaming processor 604. In other embodiments, the rendering engine 612 and/or the streaming processor 604 may be included in the processor 610, etc. In further embodiments, the streaming processor 604 can be part of the rendering engine 612.

The processor 610 may be coupled to the GPU 696. In an illustrative example, the processor 610 may be configured to communicate with the GPU 696 using graphics application programming interface (API) calls. For example, the GPU 696 may include an API calls analyzer (not shown), and the processor 610 may be configured to provide the API calls to the API calls analyzer during graphics processing performed by the GPU 696.

The electronic device 600 may further include one or more memories, such as a memory 632. The memory 632 may be coupled to the processor 610, to the GPU 696, or to both. The memory 632 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 632 may store instructions 660. The instructions 660 may be executable by the processor 610, by the GPU 696, or by both. In some embodiments, the instructions 660 may instruct the processor 610 and/or the GPU 696 to perform the processes described with regard to FIGS. 3-5.

A coder/decoder (CODEC) 634 can also be coupled to the processor 610. The CODEC 634 may be coupled to one or more microphones, such as a microphone 638. The CODEC 634 may also be coupled to one or more speakers, such as a speaker 636. The CODEC 634 may include a memory 690 storing instructions 695 executable by the CODEC 634.

FIG. 6 also shows a display controller 626 that is coupled to the processor 610 and to a display 628. In some embodiments, the electronic device 600 may further include a wireless controller 640 coupled to an antenna 642. In other embodiments, the electronic device 600 may further include a wired network controller (not shown) coupled to a computer network cable.

The electronic device 600 may further include a sensor 650 (e.g., a camera). The sensor 650 may be any type of sensor configured to capture images.

In a particular example, the processor 610, the GPU 696, the memory 632, the display controller 626, the CODEC 634, and the wireless controller 640 are included in a system-on-chip (SoC) device 622. Further, an input device 630 and a power supply 644 may be coupled to the SoC device 622. Moreover, in a particular example, as illustrated in FIG. 6, the display 628, the input device 630, the speaker 636, the microphone 638, the antenna 642, the power supply 644, and the sensor 650 are external to the SoC device 622. However, each of the display 628, the input device 630, the speaker 636, the microphone 638, the antenna 642, the power supply 644, and the sensor 650 can be coupled to a component of the SoC device 622, such as to an interface or to a controller.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The foregoing disclosed devices and functionalities may be designed and represented using computer files (e.g. computer files in file formats that include Graphic Database System II (GDSII), GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 600 of FIG. 6.

Although certain examples have been described separately for convenience, it is noted that aspects of such examples may be suitably combined without departing from the scope of the disclosure. For example, the devices 100 and 200 may be configured to operate based on aspects described with reference to each of FIGS. 3-5. Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the process 300 of FIG. 3, the process 400 of FIG. 4, or the process 500 of FIG. 5 may be initiated, controlled, or performed by a field-programmable gate array (FPGA) device, an application-specific integrated circuit (ASIC), a processing unit such as a CPU, a digital signal processor (DSP), a controller, another hardware device, a firmware device, or a combination thereof. A software module may reside in RAM, MRAM, flash memory, ROM, EPROM, EEPROM, registers, hard disk, a removable disk, a CD-ROM, or any other form of non-transitory storage medium known in the art. An exemplary storage medium is coupled to the processor such that the processor can read information from, and write information to, the storage medium. Additionally or in the alternative, the storage medium may be integral to the processor. The processor and the storage medium may reside in an ASIC. The ASIC may reside in a computing device or a user terminal. Additionally or in the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A device for generating graphics content, comprising:
   a memory comprising a general purpose register and wave slots; and
   a processor coupled to the memory, the processor configured to:
      obtain texture operation instructions corresponding to a texture operation;
      generate a virtual wave slot corresponding to the texture operation;
      determine that at least one of insufficient general purpose register space is available for the texture operation or insufficient wave slots are available for the texture operation;
      in response to determining that at least one of insufficient general purpose register space is available for the texture operation or insufficient wave slots are available for the texture operation, generate an indication that the texture operation corresponds to a deferred wave;
      execute the texture operation that corresponds to the deferred wave;
      send, to a texture processor, initial texture sample instructions corresponding to the texture operation that was executed; and
      receive texture mapped data corresponding to the initial texture sample instructions wherein the texture mapped data corresponds to a frame of content that is output to a display.

2. The device of claim 1, wherein the processor is further configured to:
   subsequent to determining that at least one of insufficient general purpose register space is available for the texture operation or insufficient wave slots are available for the texture operation, determine sufficient general purpose register space is available for the texture operation and sufficient wave slots are available for the texture operation;
   convert the virtual wave slot to a wave slot; and
   store texture attributes corresponding to the texture operation in the general purpose register.

3. The device of claim 2, wherein, subsequent to the converting the virtual wave slot and the storing the texture attributes, the processor is further configured to perform post-processing on the texture mapped data using the wave slot and the texture attributes.

4. The device of claim 1, wherein the processor comprises a pixel interpolation unit, and wherein to execute the texture operation, the processor is further configured to use the pixel interpolation unit.

5. The device of claim 1, further comprising the display, wherein the processor is further configured to send data corresponding to the texture mapped data to downstream components of the processor, wherein the data further corresponds to the frame of content that is output to the display.

6. The device of claim 1, wherein the processor is further configured to:
   repeatedly determine whether sufficient general purpose register space and wave slots are available for the texture operation; and
   upon determining that sufficient general purpose register space is available and sufficient wave slots are available for the texture operation:
      convert the virtual wave slot to a wave slot; and store texture attributes corresponding to the texture operation in the general purpose register.

7. The device of claim 1, wherein the memory further comprises a texture buffer, wherein the processor is further configured to:
obtain second texture operation instructions corresponding to a second texture operation;
determine that at least one of insufficient general purpose register space is available for the second texture operation or insufficient wave slots are available for the second texture operation;
determine that buffer storage space and a wave slot are needed for the second texture operation;
store a virtual wave slot corresponding to the second texture operation in the texture buffer; and
store texture attributes corresponding to the second texture operation in the texture buffer.

8. The device of claim 1, wherein the device comprises a wireless communication device.

9. A method for generating graphics content comprising:
obtaining texture operation instructions corresponding to a texture operation;
generating a virtual wave slot corresponding to the texture operation;
determining that at least one of insufficient general purpose register space is available for the texture operation or insufficient wave slots are available for the texture operation;
in response to determining that at least one of insufficient general purpose register space is available for the texture operation or insufficient wave slots are available for the texture operation, generating an indication that the texture operation corresponds to a deferred wave;
executing the texture operation that corresponds to the deferred wave;
sending, to a texture processor, initial texture sample instructions corresponding to the texture operation that was executed; and
receiving texture mapped data corresponding to the initial texture sample instructions;
wherein the texture mapped data corresponds to a frame of content that is output to a display.

10. The method of claim 9, further comprising:
subsequent to the determining that at least one of insufficient general purpose register space is available for the texture operation or insufficient wave slots are available for the texture operation, determining sufficient general purpose register space is available for the texture operation and sufficient wave slots are available for the texture operation;
converting the virtual wave slot to a wave slot; and
storing texture attributes corresponding to the texture operation in the general purpose register.

11. The method of claim 10, wherein, subsequent to the converting the virtual wave slot and the storing the texture attributes, the method further comprises performing post-processing on the texture mapped data using the wave slot and the texture attributes.

12. The method of claim 9, wherein the executing the texture operation comprises using a pixel interpolation unit.

13. The method of claim 9, further comprising sending data corresponding to the texture mapped data to downstream components of a processor, wherein the data further corresponds to the frame of content that is output to the display.

14. The method of claim 9, further comprising:
repeatedly determining whether sufficient general purpose register space and wave slots are available for the texture operation; and
upon determining that sufficient general purpose register space is available and sufficient wave slots are available for the texture operation:
converting the virtual wave slot to a wave slot; and
storing texture attributes corresponding to the texture operation in the general purpose register.

15. The method of claim 9, further comprising:
obtaining second texture operation instructions corresponding to a second texture operation;
determining that at least one of insufficient general purpose register space is available for the second texture operation or insufficient wave slots are available for the second texture operation;
determining that buffer storage space and a wave slot are needed for the second texture operation;
storing a virtual wave slot corresponding to the second texture operation in a texture buffer; and
storing texture attributes corresponding to the second texture operation in the texture buffer.

16. A non-transitory computer-readable medium for generating graphics content, the non-transitory computer-readable medium storing a program containing instructions that, when executed by a processor of a device, cause the device to perform a method comprising:
obtaining texture operation instructions corresponding to a texture operation;
generating a virtual wave slot corresponding to the texture operation;
determining that at least one of insufficient general purpose register space is available for the texture operation or insufficient wave slots are available for the texture operation;
in response to determining that at least one of insufficient general purpose register space is available for the texture operation or insufficient wave slots are available for the texture operation, generating an indication that the texture operation corresponds to a deferred wave;
executing the texture operation that corresponds to the deferred wave;
sending, to a texture processor, initial texture sample instructions corresponding to the texture operation that was executed; and
receiving texture mapped data corresponding to the initial texture sample instructions;
wherein the texture mapped data corresponds to a frame of content that is output to a display.

17. The non-transitory computer-readable medium of claim 16, the method further comprising:
subsequent to the determining that at least one of insufficient general purpose register space is available for the texture operation or insufficient wave slots are available for the texture operation, determining sufficient general purpose register space is available for the texture operation and sufficient wave slots are available for the texture operation;
converting the virtual wave slot to a wave slot;
storing texture attributes corresponding to the texture operation in the general purpose register; and
subsequent to the converting the virtual wave slot and the storing the texture attributes, the method further comprises performing post-processing on the texture mapped data using the wave slot and the texture attributes.

18. The non-transitory computer-readable medium of claim 16, the method further comprising:
- obtaining second texture operation instructions corresponding to a second texture operation;
- determining that at least one of insufficient general purpose register space is available for the second texture operation or insufficient wave slots are available for the second texture operation;
- determining that buffer storage space and a wave slot are needed for the second texture operation;
- storing a virtual wave slot corresponding to the second texture operation in a texture buffer; and
- storing texture attributes corresponding to the second texture operation in the texture buffer.

* * * * *